US012083799B2

(12) United States Patent
Kogane

(10) Patent No.: US 12,083,799 B2
(45) Date of Patent: Sep. 10, 2024

(54) PRINTING APPARATUS, STAND AND MOVEMENT CONTROL METHOD

(71) Applicant: CASIO COMPUTER CO., LTD., Tokyo (JP)

(72) Inventor: Takayuki Kogane, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 45 days.

(21) Appl. No.: 17/839,798

(22) Filed: Jun. 14, 2022

(65) Prior Publication Data

US 2023/0001693 A1 Jan. 5, 2023

(30) Foreign Application Priority Data

Jul. 1, 2021 (JP) ................................ 2021-109803

(51) Int. Cl.
*B41J 2/14* (2006.01)
*B41J 2/035* (2006.01)
(Continued)

(52) U.S. Cl.
CPC ........... *B41J 2/14153* (2013.01); *B41J 2/035* (2013.01); *B41J 2/04505* (2013.01); *B41J 3/407* (2013.01); *B41J 11/008* (2013.01)

(58) Field of Classification Search
CPC ...... B41J 11/008; B41J 2/16508; B41J 29/13; B41J 29/38; B41J 2/14153; B41J 2/035;
(Continued)

(56) References Cited

U.S. PATENT DOCUMENTS 8,657,406 B2 2/2014 Higashikawa et al.
9,522,101 B2 12/2016 Rabe et al.
(Continued)

FOREIGN PATENT DOCUMENTS

JP H09131926 A 5/1997
JP 2002361897 A 12/2002
(Continued)

OTHER PUBLICATIONS

Japanese Office Action (and an English language translation thereof) dated Apr. 18, 2023, issued in counterpart Japanese Application No. 2021-109803.
(Continued)

*Primary Examiner* — Kristal Feggins
(74) *Attorney, Agent, or Firm* — Holtz, Holtz & Volek PC

(57) ABSTRACT

A printing apparatus includes a body, a print head, a mover, a stand and a sensor. The body has an opening that faces a printing target during printing. The print head is provided in the body and performs the printing on the printing target. The mover is provided in the body and moves the print head to a first position and a second position. The first position corresponds to the opening, and the second position is different from the first position. The stand is detachable from the body. The sensor at least senses that a distance between the body and the stand is equal to or shorter than a predetermined distance. The mover moves the print head from the second position to the first position in response to the sensor sensing that the distance between the body and the stand is equal to or shorter than the predetermined distance.

17 Claims, 8 Drawing Sheets

(51) Int. Cl.
*B41J 2/045* (2006.01)
*B41J 3/407* (2006.01)
*B41J 11/00* (2006.01)

(58) Field of Classification Search
CPC .......... B41J 2/04505; B41J 3/36; B41J 3/407; A45D 34/00; A45D 34/04
See application file for complete search history.

(56) References Cited

U.S. PATENT DOCUMENTS

| | | | | |
|---|---|---|---|---|
| 9,907,734 | B2 | 3/2018 | Rabe et al. | |
| 9,949,552 | B2 | 4/2018 | Rabe et al. | |
| 2014/0060560 | A1* | 3/2014 | Bitoh | B41J 3/407 132/73 |
| 2016/0174680 | A1* | 6/2016 | Yamasaki | B41J 3/407 132/200 |
| 2017/0273433 | A1* | 9/2017 | Hori | A45D 34/04 |
| 2023/0001720 | A1* | 1/2023 | Osakabe | B41J 2/17513 |

FOREIGN PATENT DOCUMENTS

| | | | |
|---|---|---|---|
| JP | 2013071443 | A | 4/2013 |
| JP | 2015159975 | A | 9/2015 |
| JP | 2017526396 | A | 9/2017 |
| JP | 2019141684 | A | 8/2019 |
| JP | 2020037204 | A | 3/2020 |

OTHER PUBLICATIONS

Japanese Office Action (and an English language translation thereof) dated Mar. 5, 2024, issued in counterpart Japanese Application No. 2023-090582.

* cited by examiner

PRINTING APPARATUS, STAND AND MOVEMENT CONTROL METHOD

CROSS-REFERENCE TO RELATED APPLICATIONS

This application is based upon and claims the benefit of priority from Japanese Patent Application No. 2021-109803 filed on Jul. 1, 2021, the entire content of which is incorporated herein by reference.

BACKGROUND

Technical Field

The present disclosure relates to a printing apparatus, a stand and a movement control method.

Description of Related Art

For example, when makeup is applied to a person's skin, a person manually applies makeup thereto by using a makeup tool, such as a sponge or a brush, conventionally.

Nowadays, instead of such a manual application work by a person, there is proposed an apparatus that applies (prints) liquid (cosmetic ink) of a skin color or the like to skin. (See, for example, JP 2019-141684 A.)

This apparatus employs the inkjet system and sprays and thereby applies liquid for skin ("treatment composition" in JP 2019-141684 A) to the skin surface from a nozzle, thereby forming coatings on parts where skin deviations are present.

SUMMARY

According to an aspect of the present disclosure, there is provided a printing apparatus including:

a body having an opening that faces a printing target during printing;

a print head that is provided in the body and performs the printing on the printing target;

a mover that is provided in the body and moves the print head to a first position corresponding to the opening and a second position different from the first position;

a stand detachable from the body; and a sensor that at least senses that a distance between the body and the stand is equal to or shorter than a predetermined distance, wherein the mover moves the print head from the second position to the first position in response to the sensor sensing that the distance between the body and the stand is equal to or shorter than the predetermined distance.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

First Embodiment

With reference to FIG. 1 to FIG. 7, a first embodiment of a printing apparatus, a stand and a movement control method according to the present disclosure will be described.

Although various limitations technically preferable for carrying out the present disclosure are put on embodiments described below, the scope of the present disclosure is not limited to the following embodiments or illustrated examples.

Figure 1:
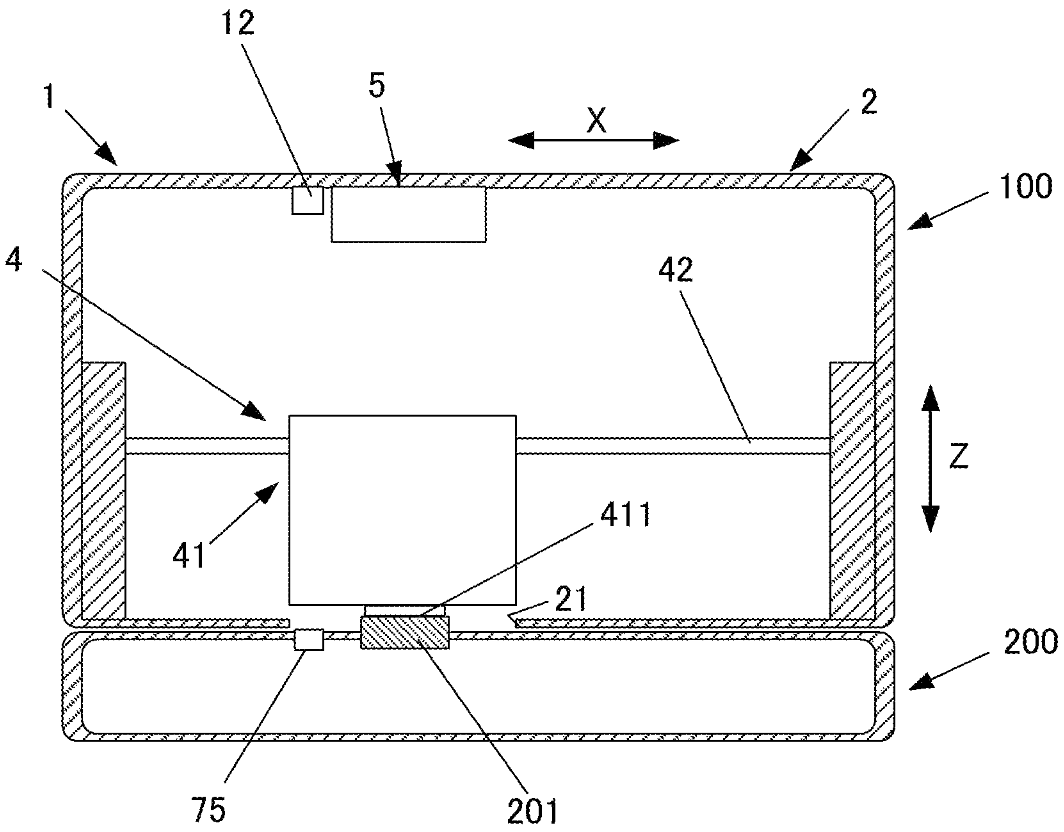
FIG. 1 is a sectional view of the main part of a printing apparatus according to an embodiment(s) taken along a plane parallel to the front-back direction and the up-down direction of the printing apparatus, schematically showing configuration of the main part in the printing apparatus.

FIG. 1 is a sectional view of the main part of a printing apparatus 1 according to an embodiment(s), schematically showing configuration of the main part in the printing apparatus.

Hereinafter, "X direction" and "Z direction" are those shown in FIG. 1.

Figure 2:
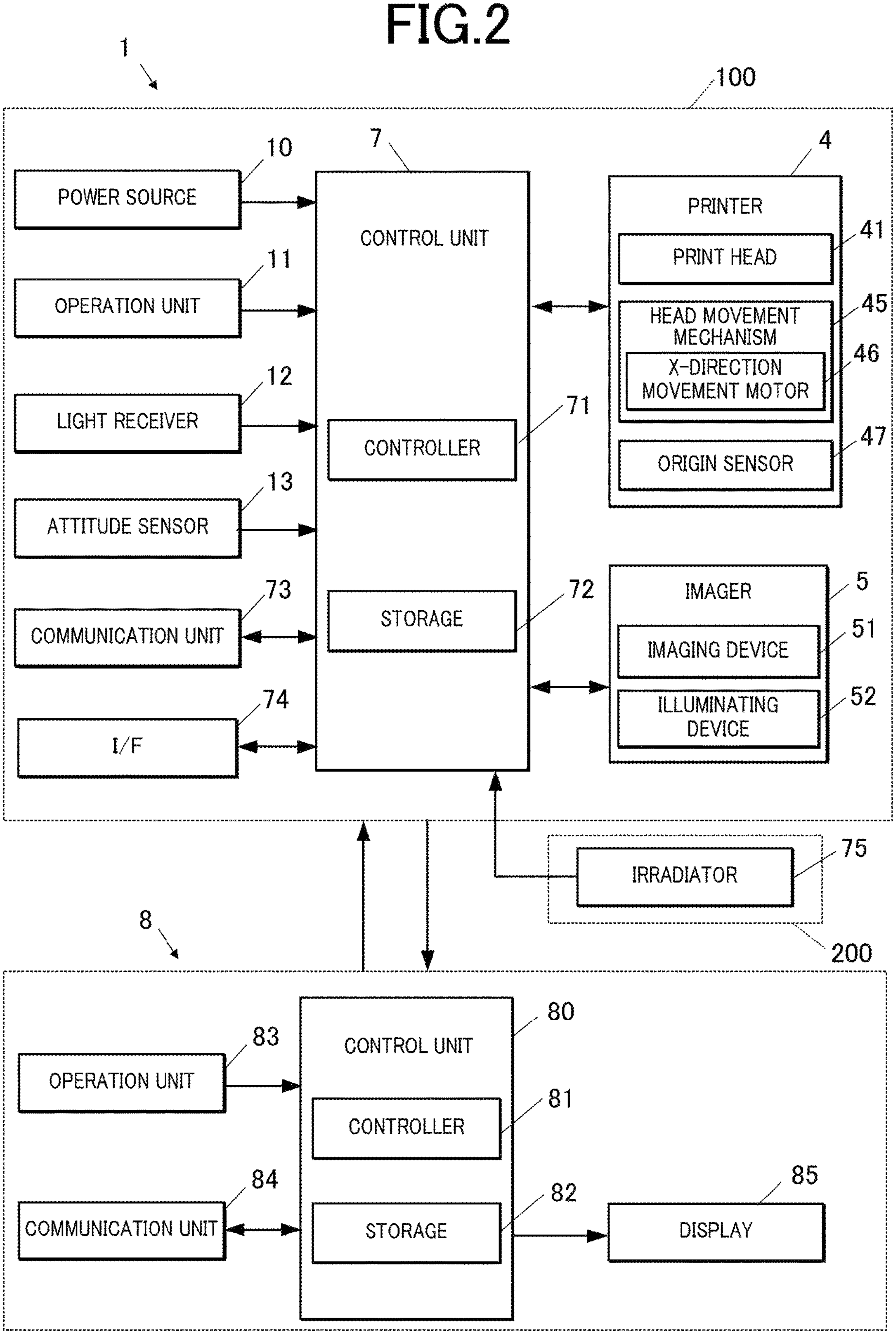
FIG. 2 is a block diagram of the main parts of a printing apparatus according to a first embodiment and its cooperating terminal apparatus, showing control configurations thereof.

In this embodiment, the printing apparatus 1 operates in cooperation with a terminal apparatus 8 as an external apparatus. FIG. 2 is a block diagram of the main parts of the printing apparatus 1 and its cooperating terminal apparatus 8, showing functional configurations thereof.

The printing apparatus 1 (body 100 described below) of this embodiment is a handheld printing apparatus (applicator) formed in a size holdable in one hand, and hence can be used while being held in one hand.

The printing apparatus 1 is for applying (printing) liquid of a skin color or the like, such as not-shown cosmetic ink, to the skin surface S (shown in FIG. 3 and FIG. 4) of a person as a printing target (application target). A user uses the printing apparatus 1 by bringing it over the printing target (application target). The printing target (application target) of the printing apparatus 1 is not limited to the skin surface S of a person. For example, the printing apparatus 1 may be a nail printer that applies color ink of various colors or base ink of a color, such as white, to the surface of a nail as the printing target.

As shown in FIG. 1, the printing apparatus 1 includes a body 100 and a stand 200 detachable from the body 100.

In this embodiment, the stand 200 is a stand (capping device) having a protector 201 (e.g., cap) that covers and protects a discharger (discharge surface) 411 of a print head 41 of a printer 4 described below. The protector 201 is not particularly limited in configuration, material or the like in detail as far as it can protect the discharger 411 from drying, for example.

It is recommended that the body 100 be placed on the stand 200 while the printing apparatus 1 is not in use (during no-printing).

As described below, the body 100 has an opening 21, and the discharger 411 of the print head 41 can be exposed through the opening 21. The position where the discharger 411 is exposed through the opening 21 is a capping position ("first position" described below) for the print head 41. The protector 201 of the stand 200 is arranged at a position to be able to cover the discharger 411 when the body 100 is on the stand 200 with the print head 41 at the capping position (shown in FIG. 1, etc.).

The printing apparatus 1 includes a sensor that senses the proximity/remoteness state of the body 100 and the stand 200 (to be specific, the protector 201 included in the stand 200), namely, senses that the body 100 and the stand 200 are close to one another or far from one another.

In this embodiment, either the body 100 or the stand 200 includes an irradiator that sends out (emits) electromagnetic waves (i.e., irradiates the printing target with electromagnetic waves), and the sensor receives the electromagnetic waves emitted from the irradiator.

More specifically, an irradiator 75 is arranged on the upper surface of the stand 200 near the protector 201, and a light receiver 12 is arranged as the sensor in the body 100 to receive electromagnetic waves from the irradiator 75.

The light receiver 12 is an optical sensor that senses electromagnetic waves when they are emitted from the irradiator 75, and when sensing the electromagnetic waves, outputs, to a controller 71, a light receiving signal(s) indicating that light has been received.

In FIG. 1, etc., the light receiver 12 is arranged at a position that is in the body 100, is on the top panel of the body 100 and corresponds to the opening 21, and receives electromagnetic waves from the irradiator 75 through the opening 21. The arrangement or the like of the light receiver 12 is not limited to the illustrated example. The light receiver 12 may be arranged, for example, at a position that is outside the body 100 and near the opening 21, substantially face-to-face with the irradiator 75, for example.

Although the type, intensity or the like of the electromagnetic waves that the irradiator 75 emits are not particularly limited, it is preferable that they be electromagnetic waves in a wavelength band of not visible light (e.g., infrared rays or the like having a wavelength longer than that of visible light) so that the light receiver 12 can sense electromagnetic waves precisely even under an indoor fluorescent light, natural light, or the like.

The light receiver 12 as the sensor is sensitive to electromagnetic waves that the irradiator 75 emits.

Sensing results by the light receiver 12 as the sensor are sent to the controller 71 described below.

Either one of the body 100 and the stand 200 includes an irradiator, and either one (the other one in this embodiment) of these includes a light receiver as the sensor. Hence, for example, to the contrary to the example shown in FIG. 1, etc., the body 100 may include an irradiator, and the stand 200 may include a light receiver as the sensor. In this case, the stand 200 is provided with a transmission system that transmits sensing results by the light receiver to the body 100. Examples of the transmission system in this case include various types of wireless communication. The stand 200 may also have a function to charge the body 100.

As shown in FIG. 1, etc., the body 100 has a substantially box-shaped case 2.

The lower surface of the case 2 is provided with the opening 21 at a position that is rather left side in the front-back direction (X direction).

The opening 21 is formed to be large enough to expose the discharger 411 of the print head 41 described below, thereby not being an obstacle to printing operation of the printer 4. In this embodiment, through the opening 21, the imager 5 performs imaging, and the light receiver 12 receives electromagnetic waves from the irradiator 75. Hence, the opening 21 is formed so as not to be an obstacle to imaging operation of the imager 5 and light receiving operation of the light receiver 12 either.

The opening 21 is not particularly limited in shape, size or the like in detail.

On the surface of the case 2, an operation unit 11 (shown in FIG. 2) is arranged, for example.

The operation unit 11 is for the user to make various inputs. The operation unit 11 includes operation buttons for making various inputs, such as a power switch button to turn on and off a power source of the printing apparatus 1, a stop button to stop operation and a printing start button to make an instruction to start printing. For example, when the user operates the power switch button of the operation unit 11, an instruction signal corresponding to the operation is output to a control unit 7 (shown in FIG. 2), which is described below, to turn on or off the power source of the printing apparatus 1.

The shape of the case 2, the number or arrangement of operation units 11 each including one or more operation buttons, or the like is not particularly limited. For example, the operation unit 11 may be arranged on any surface of the case 2, which is exemplified by the front surface, upper surface and side surfaces.

In the case 2, the printer 4, the imager 5 and so forth are arranged.

The printer 4 includes the print head 41 and a head movement mechanism 45 (shown in FIG. 2) that moves the print head 41 in the front-back direction of the printing apparatus 1 (X direction shown in FIG. 1, etc.).

Figure 3:
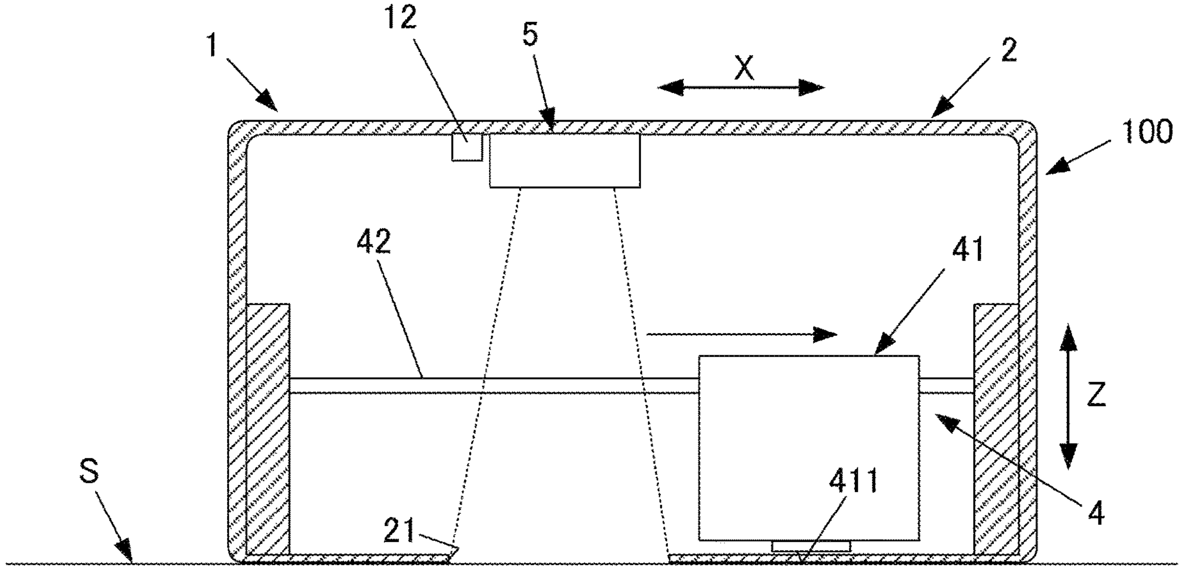
FIG. 3 is a schematic sectional view of the main part of a body, showing how an imager performs imaging.

The print head 41 performs printing on the printing target (skin surface S in this embodiment, shown in FIG. 3, etc.).

The print head 41 is assumed to be a cartridge-integrated print head including a built-in reservoir that stores liquid (cosmetic ink of a skin color or the like in this embodiment) and the discharger 411 (discharge surface provided with a not-shown nozzle) that discharges the liquid (ink).

The discharger 411 is arranged on the lower surface of the print head 41 (surface facing the skin surface S as the printing target), and the discharger 411 is exposed downward through the opening 21 of the case 2 during the printing operation (printing).

The print head 41 is not limited to the one in which the reservoir and the discharger 411 (discharge mechanism part) are integrated. For example, the print head 41 may be configured such that the reservoir and the discharger 411 (discharge mechanism part), which discharges liquid, are separate components, and the reservoir is connected to the discharger 411 (discharge mechanism part) via a supply tube or the like during printing.

The print head 41 of this embodiment is an inkjet head that performs printing by spraying fine droplets of liquid (ink) from the discharger 411 at the printing target (skin surface S). The method for discharging ink is not particularly limited, but, for example, may be a thermal method of heating and discharging ink, or a discharge method utilizing the piezoelectric effect of piezoelectric elements that deform by application of voltage.

The liquid (ink) is, for example, cosmetic ink of a skin color or a color similar to the skin color.

The print head 41 is, in the state of being mounted on (held by) a not-shown carriage, supported by an X-direction movement stage that moves the carriage (for scanning) in the X-direction (front-back direction of the printing apparatus 1).

In this embodiment, the print head 41 can be positioned at a first position where the discharger 411 faces the opening 21 and a second position where the discharger 411 does not face the opening 21. In the present disclosure, the "position where the discharger 411 does not face the opening 21" or "position not corresponding to the opening 21" means a position, in the body 100, not corresponding to the opening 21.

Figure 4:
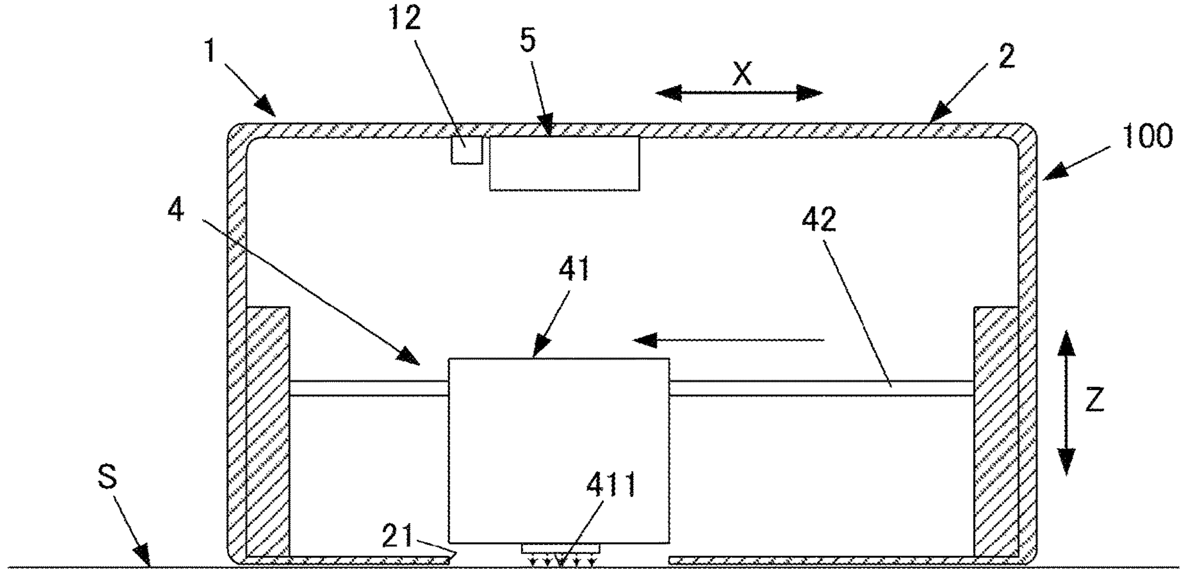
FIG. 4 is a schematic sectional view of the main part of the body, showing how a print head performs printing at a first position.
Figure 5:
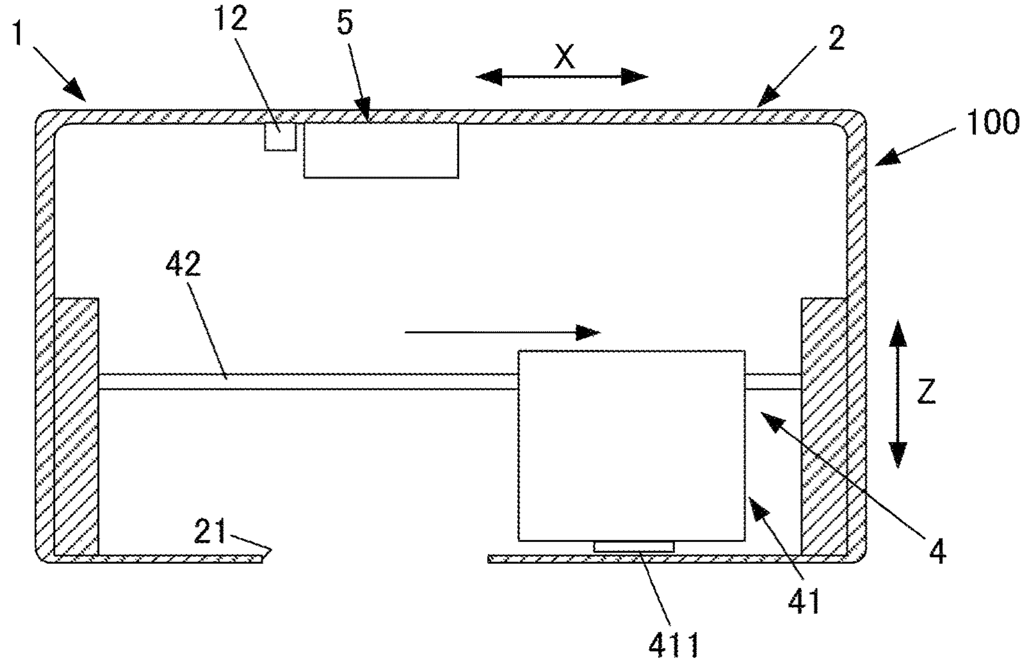
FIG. 5 is a schematic sectional view of the main part of the body, showing a state in which the print head has moved to a second position.
Figure 6:
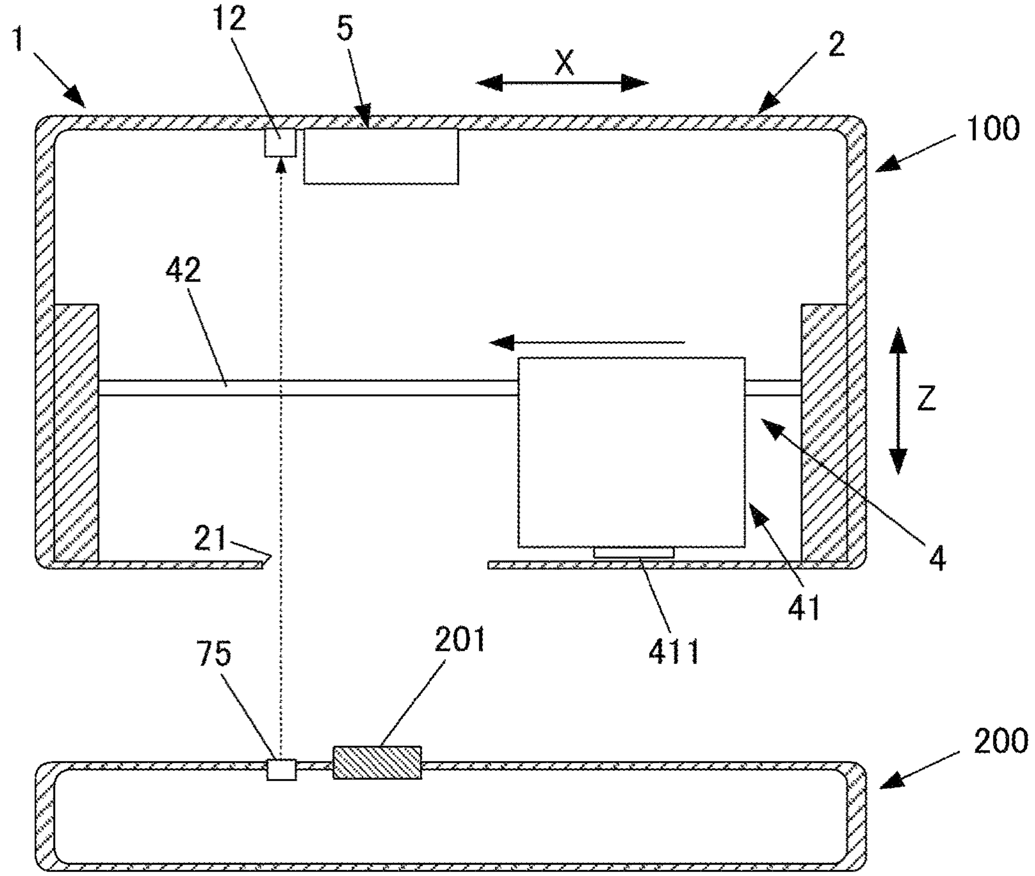
FIG. 6 is a schematic sectional view of the main part of the body, showing a state in which the body being close to a stand is sensed.

More specifically, while the printing operation is being performed (shown in FIG. 4) and while the body 100 is placed on the stand 200 (shown in FIG. 1), the print head 41 is positioned at the first position, and at the other times, the print head 41 is positioned at the second position (shown in FIG. 3 and FIG. 5).

In the state in which the print head 41 is positioned at the first position, the opening 21 is closed (covered) by the print head 41 substantially entirely (shown in FIG. 4).

As described below, when the light receiver 12 as the sensor senses that the body 100 and the stand 20 are close to one another, the head movement mechanism 45 (shown in FIG. 2) moves the print head 41 to the first position.

More specifically, when the light receiver 12 senses that the opening 21 of the body 100 and the stand 200 face and are close to one another, the head movement mechanism 45 moves the print head 41 to the first position. Thus, when the opening 21 gets close to the protector 201 for being capped, the discharger 411 is exposed through the opening 21 and properly capped.

The head movement mechanism 45 is a mover that moves the print head 41 to the first position and the second position different from the first position.

The head movement mechanism 45 includes an X-direction movement motor 46 (shown in FIG. 2) as a driver to properly move the print head 41 in the X direction. By being driven by the X-direction movement motor 46, the print head 41 mounted on the carriage moves in the X direction along an X-direction guide 42 arranged on the X-direction movement stage.

The printer 4 includes an origin sensor 47 (shown in FIG. 2) that senses arrival of the print head 41 at the origin position (e.g., the front end (left end in FIG. 1, etc.) of the X-direction movement stage).

The origin sensor 47 is, for example, an optical sensor. The origin sensor 47 is not particularly limited in configuration in detail.

The X-direction movement motor 46 is, for example, a stepping motor. After the origin sensor 47 senses arrival of the print head 41 at the origin position, the controller 71 counts pulses or the like input to the stepping motor, thereby grasping the position of the print head 41 at any time.

The method for grasping the position of the print head 41 is not limited to the above.

The imager 5 is arranged in the body 100 and images the outside of the body 100 through the opening 21. In this embodiment, the imager 5 can image the outside of the body 100 while the print head 41 is at the second position. The imager 5 images the printing target (skin surface S in this embodiment), thereby obtaining a captured image(s).

The imager 5 includes an imaging device 51 and an illuminating device 52.

The imaging device 51 is a small-sized camera that includes a solid state image sensor, such as a CCD (Charge Coupled Device) image sensor or a CMOS (Complementary Metal Oxide Semiconductor) image sensor, having two million pixels or more, and a lens. The illuminating device 52 is, for example, an illuminating lamp, such as a white LED.

In this embodiment, as described below, captured images are analyzed, so that parts where tonal deviations are present (e.g., blotches) on the skin surface S are identified as printing target points.

For example, as shown in FIG. 3, the imager 5 is arranged in the case 2 above the opening 21. Through the opening 21, the imaging device 51 images the printing target while the illuminating device 52 is illuminating the printing target, thereby obtaining an image(s).

The imaging area of the imaging device 51 is almost the entire opening 21, and the optical axis of the lens (not shown) of the imaging device 51 substantially coincides with the axis of the nozzle (not shown) of the print head 41 positioned at the first position (shown in FIG. 4). This prevents a mismatch between the printing target (skin surface S) recognized by imaging and a landing position(s) of ink from the print head 41, and enables precise printing on the parts as printing target points (e.g., blotches).

In this embodiment, the body 100 of the printing apparatus 1 includes an attitude sensor 13.

The attitude sensor 13 is a sensor capable of sensing, for example, the direction of movement (e.g., in three directions of front-back direction, right-left direction and up-down direction) and/or the moving velocity (acceleration) of the body 100. For example, the attitude sensor 13 may be an acceleration sensor, a hexaxial sensor of an acceleration sensor and a gyroscope sensor combined, or the like.

The printing apparatus 1 of this embodiment performs the printing operation and so forth with the body 100 held in the user's hand. The attitude sensor 13 senses the movement of the body 100 and outputs the sensing result to the controller 71 as needed.

The attitude sensor 13 is not particularly limited in configuration, position to be arranged or the like in detail as far as it can sense the movement and attitude of the body 100.

The printing apparatus 1 includes a communication unit 73, an interface (I/F) 74 and a power source 10. Although not shown, the printing apparatus 1 may include a display, various lamps and indicators.

The communication unit 73 is configured to send and receive information to and from the below-described terminal apparatus 8, which operates in cooperation with the printing apparatus 1.

The communication between the printing apparatus 1 and the terminal apparatus 8 is performed, for example, by a wireless LAN. The communication between the printing apparatus 1 and the terminal apparatus 8 is not limited to this, but may be performed by any system. For example, a network line, such as the Internet, may be used, or wireless communication based on a short-range wireless communication standard, such as Bluetooth® or Wi-Fi, may be performed. Further, this communication is not limited to wireless communication. Hence, the communication unit 73 may be configured to send and receive various data to and from the terminal apparatus 8 by wireline connection. The communication unit 73 includes an antenna chip compatible with the communication system of the terminal apparatus 8.

The interface 74 includes a connector, a USB control circuit and/or the like to enable USB connection or the like between the printing apparatus 1 and various external apparatuses and peripherals.

The communication unit 73 and the interface 74 are not essential components for the printing apparatus 1. The printing apparatus 1 may not include these or may include only one of these.

The power source 10 includes a power supply circuit, and generates power source voltage and electric power for the components of the printing apparatus 1 and supplies these to the components as needed.

The printing apparatus 1 includes the control unit 7.

The control unit 7 is a computer that includes: the controller 71 configured by a processor, such as a CPU (Central Processing Unit); and a storage 72 including a not-shown ROM (Read Only Memory) and a not-shown RAM (Random Access Memory).

The whole or part of the storage 72 may be a separate component and arranged outside the control unit 7.

The storage 72 stores various programs that cause the printing apparatus 1 to operate (e.g., a program for a printing process, etc.), various data and so forth. The controller 71 loads these programs, for example, to a working area of the RAM and executes the programs, thereby performing overall control of the components of the printing apparatus 1.

In this embodiment, the controller 71, in particular, controls and thereby causes the printer 4 to perform the printing operation or the like, controls and thereby causes the imager 5 to image the printing target or the like, and also functions as a proximity determiner that determines whether the body 100 and the stand 200 having the protector 201 are close to one another, as a movement controller that controls movement of the print head 41, and as an information obtaining unit that obtains analysis results of captured images, for example. These functions of the controller 71 are carried out by the CPU of the controller 71 and a program(s) stored in the ROM of the storage 72 working together.

When receiving a light receiving signal from the light receiver 12 as the sensor, the controller 71 as the proximity determiner (light receiving determiner) determines that the body 100 and the stand 200 having the protector 201 are close to one another.

When the controller 71 as the proximity determiner determines that the body 100 and the stand 200 are close to one another, the controller 71 as the movement controller controls and thereby causes the head movement mechanism 45 to move the print head 41 to the first position.

The controller 71 may make determination, for example, about the intensity level of the electromagnetic waves sensed by the light receiver 12 or the duration (sensing duration) of the electromagnetic waves sensed by the light receiver 12, and when the intensity of the sensed electromagnetic waves is equal to or higher than a predetermined threshold level or when the sensing duration of the electromagnetic waves is equal to (or longer than) a certain length of time (preset length of time), determine that the body 100 and the stand 200 are close to one another.

For example, in the latter case, when the light receiver 12 as the sensor is sensing the electromagnetic waves for a certain length of time (preset length of time) or longer, the head movement mechanism 45 moves the print head 41 to the first position where the discharger 411 faces the opening 21, whereas when the sensing duration of the electromagnetic waves by the light receiver 12 is shorter than the certain length of time (preset length of time), the head movement mechanism 45 positions the print head 41 at the second position, which is different from the first position.

In the case where the controller 71 is configured to determine that the body 100 and the stand 20 are close to one another when the light receiver 12 senses even a small amount of the electromagnetic waves, the controller 71 determines that the body 100 and the stand 20 are close to one another, namely, in proximity, when the body 100 grazes near the stand 200 and accordingly the light receiver 12 senses the electromagnetic waves, but the body 100 is actually still in the middle of printing. This is inappropriate.

The intensity level of the electromagnetic waves sensed by the light receiver 12 becomes higher as the distance between the light receiver 12 and the irradiator 75 becomes shorter. When the light receiver 12 is sensing the electromagnetic waves for a certain length of time, it is highly likely that the body 100 is moving toward the stand 200.

Hence, for example, a relationship between (i) the distance between the body 100 and the stand 200 and (ii) the intensity level of electromagnetic waves (i.e., intensity level for each distance) is stored in the form of a table or the like in the storage 72 or the like. Also, threshold values for the intensity level of electromagnetic waves and the sensing duration of electromagnetic waves are predetermined and stored. In this case, when the sensing result by the light receiver 12 exceeds one or more of these predetermined threshold values, the controller 71 determines that the body 100 and the stand 200 are close to one another.

The threshold values for the intensity level of electromagnetic waves and the sensing duration of electromagnetic waves are set as appropriate. The electromagnetic waves that the light receiver 12 senses could be affected by light environment thereargound or the like. Hence, the threshold values may be changed depending on whether the printing apparatus 1 is used indoors or used outdoors under natural light, for example.

When the imager 5 obtains a captured image, the controller 71 sends data of the captured image to the terminal apparatus 8. The controller 71 as the information obtaining unit receives print data from the terminal apparatus 8 as an analysis result of the captured image. The print data specifies a printing target point (area where printing is to be performed, e.g., blotch) by X and Y coordinate values or the like, and includes information indicating its position and information indicating the amount of liquid to be applied thereto to make the color of the printing target point similar to the color of the surrounding skin (e.g., the number of ink layers to be applied, etc.).

The information that the controller 71 as the information obtaining unit receives from the terminal apparatus 8 is not limited to the above. For example, when the area of a blotch, depth of color thereof and so forth are obtained by image analysis, the controller 71 may receive data thereof from the terminal apparatus 8. If the printing apparatus 1 includes a display or the like, the controller 71 may cause the display to perform display or the like based on the data sent from the terminal apparatus 8 to show it to the user.

The printing apparatus 1 of this embodiment cooperates with an external apparatus, such as the terminal apparatus 8, and operates in accordance with instructions input from the terminal apparatus 8 or the like.

The terminal apparatus 8 is assumed to be a portable terminal apparatus, such as a smartphone or a tablet, but not limited thereto. The terminal apparatus 8 is not particularly limited as far as it can communicate with the printing apparatus 1. Examples thereof include a laptop PC, a stationary PC, and a terminal apparatus for gaming.

The terminal apparatus 8 includes an operation unit 83, a communication unit 84, a display 85 and a control unit 80.

The operation unit 83 is configured to do various inputs/settings or the like in accordance with user operations. When a user operates the operation unit 83, an input signal corresponding to the operation is sent to the control unit 80. In this embodiment, a touchscreen is integrated with the surface of the display 85, and the user can make operations for various inputs/settings or the like by touching the touchscreen.

The operation unit 83 for various inputs/settings or the like is not limited to the touchscreen. For example, the operation unit 83 may include various operation buttons, a keyboard, a pointing device and/or the like.

The operation unit 83 may be operated for various inputs/settings or the like in the printing apparatus 1. For example, when the user operates the operation unit 83, the printing operation of the printing apparatus 1 may be started.

The communication unit 84 communicates with the communication unit 73 of the printing apparatus 1. For example, the communication unit 84 receives data of various images and so forth sent from the printing apparatus 1. The communication unit 84 includes a wireless communication module or the like capable of communicating with the communication unit 73 of the printing apparatus 1.

The communication unit 84 may be any as far as it can communicate with the printing apparatus 1, namely, as far as it is compatible with the communication standard of the communication unit 73 of the printing apparatus 1.

The display 85 is configured, for example, by an LCD (Liquid Crystal Display), an organic electroluminescent display, another flat display, or the like.

In this embodiment, the display 85 can display, for example, images and so forth sent from the printing apparatus 1.

As described above, a touchscreen for various inputs may be integrated with the surface of the display 85. In this case, the touchscreen also functions as the operation unit 83.

The display 85 can further display various guidance screens, warning display screens and so forth under the control of the controller 81. The display 85 may also be capable of displaying analysis results (e.g., positions or areas of blotches, depth of color of blotches, etc.) of captured images sent from the printing apparatus 1.

If the imaging device 51 is capable of shooting live-view displayable moving images, the display 85 may display moving images shot by the imaging device 51 in live view as needed.

In the case where the display 85 can display analysis results of captured images and/or moving images shot by the imaging device 51, the user may be allowed to input instructions about where (part/area) printing is to be performed, viewing the screen.

The control unit 80 is a computer that includes: the controller 81 configured by a not-shown CPU (Central Processing Unit) or the like; and a storage 82 including a not-shown ROM (Read Only Memory) and a not-shown RAM (Random Access Memory).

The storage 82 stores various programs that cause the components of the terminal apparatus 8 to operate, various data and so forth.

More specifically, the ROM or the like of this embodiment stores an operating program for overall control of the components of the terminal apparatus 8, not-shown various programs including a printing process application program for performing the printing process with the printing apparatus 1, and so forth. The control unit 80 loads these programs, for example, to a working area of the RAM and executes the programs, thereby controlling the terminal apparatus 8.

The controller 81 performs integrative control of operation of the components of the terminal apparatus 8. The controller 81 and a program(s), such as the printing process application program, stored in the storage 82 work together, thereby carrying out various functions for the printing apparatus 1 to perform printing on the printing target (skin surface S).

For example, in this embodiment, a captured image obtained by the imager 51 is sent from the printing apparatus 1 to the terminal apparatus 8, and the controller 81 analyzes the captured image and thereby identifies a printing target point (area where printing is to be performed, e.g., blotch), depth of color thereof and so forth.

The controller 81 then generates print data that indicates the printing target point (area where printing is to be performed, e.g., blotch) by X and Y coordinate values or the like and also indicates what degree of printing is to be performed (e.g., the number of ink layers to be applied, etc.) on the printing target point, and sends the generated print data as an analysis result to the printing apparatus 1.

If the user inputs an instruction about where (part/area) printing is to be performed, viewing the screen of the display 85, the controller 81 generates the print data in accordance with the contents of the input.

Hereinafter, with reference to FIG. 7, etc., a capping control method/process (movement control method) for the printing apparatus of this embodiment will be described.

In this embodiment, when printing is to be performed by using the printing apparatus 1, the user holds the body 100 of the printing apparatus 1 in one hand and detaches the body 100 from the stand 200, and the body 100 performs the printing operation while being moved by the user over the skin surface S (e.g., facial surface, such as cheeks or forehead), which is the printing target, of a person.

Figure 7:
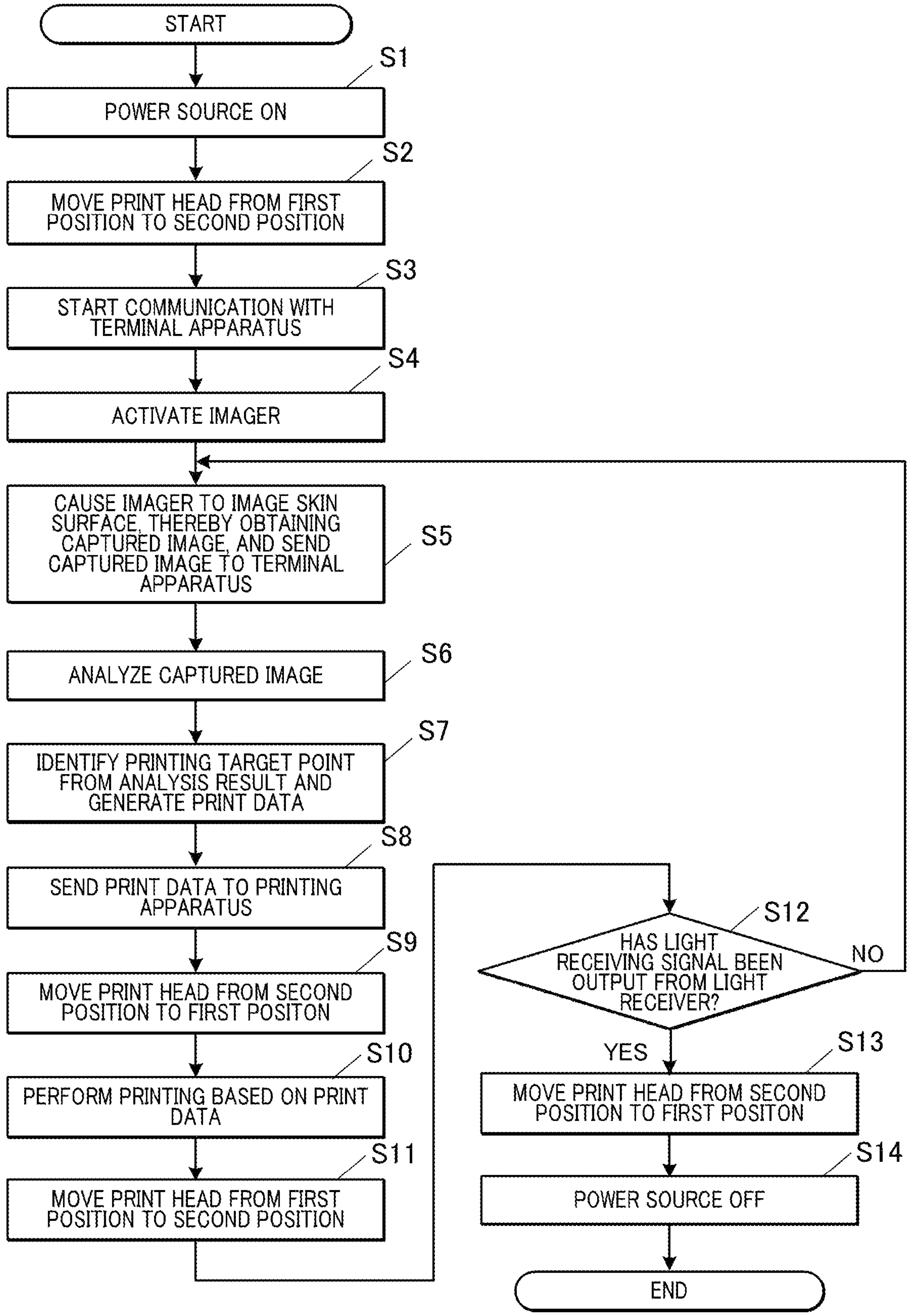
FIG. 7 is a flowchart of a capping control process in the first embodiment.

More specifically, when the user detaches the body 100 from the stand 200 and operates the power switch button, as shown in FIG. 7, the printing apparatus 1 is powered up (Power Source ON) in response to the input operation (Step S1). Instead of the user operation, the printing apparatus 1 may be automatically powered up when the body 100 is detached from the stand 200 and this separation of the body 100 from the stand 200 is sensed.

In the state in which the body 100 is placed on the stand 200 (shown in FIG. 1), the print head 41 is positioned at the position where the discharger 411 is covered by the protector 201 of the stand 200, namely, the first position.

When the printing apparatus 1 is powered up, the controller 71 causes the X-direction movement motor 46 of the head movement mechanism 45 to operate to move the print head 41 from the first position to the second position (Step S2).

In addition, communication between the printing apparatus 1 and the terminal apparatus 8 is started (Step S3), and the imager 5 is activated (Step S4).

When the user moves the body 100 while pressing the opening 21 of the body 100 against the skin surface S, the controller 71 controls the imaging device 51 and the illuminating device 52 of the imager 5 and causes the imaging device 51 to image the skin surface S as the printing target (shown in FIG. 3), thereby obtaining a captured image, and sends data of the obtained captured image to the terminal apparatus 8 via the communication unit 73 (Step S5).

In the terminal apparatus 8, the controller 81 analyzes the image data received from the printing apparatus 1 (Step S6). More specifically, the controller 81 senses a part (e.g., blotch, etc.) where a tonal deviation is present on the skin surface S. The controller 81 may cause the display 85 to display the captured image, the analysis result thereof and/or the like, so that the user can check these on the display screen of the terminal apparatus 8 as needed.

The controller 81 then identifies a printing target point from the analysis result and generates print data for proper printing on the point (Step S7), and sends the generated print data from the terminal apparatus 8 to the printing apparatus 1 via the communication unit 84 (Step S8).

Before sending the print data, the controller 81 may cause the display 85 to display a screen asking the user whether printing is to be performed on the position identified as the printing target point in order to obtain the user's judgement. At the time, on the captured image of the skin surface S, an image after printing based on the print data may be superimposed and displayed. This makes it easier for the user to imagine a finished product generated by printing.

When receiving the print data, the controller 71 of the printing apparatus 1 outputs the print data to the printer 4, and causes the X-direction movement motor 46 of the head movement mechanism 45 to operate to move the print head 41 from the second position to the first position (Step S9).

Then, the print head 41 positioned at the first position discharges ink from the discharger 411, thereby performing the printing operation (printing) based on the print data (Step S10, shown in FIG. 4).

When the printing operation finishes, the controller 71 again causes the X-direction movement motor 46 of the head movement mechanism 45 to operate to move the print head 41 from the first position to the second position (Step S11, shown in FIG. 5).

The controller 71 always determines whether the light receiving signal indicating reception of the electromagnetic waves from the irradiator 75 has been output from the light receiver 12 as the sensor (Step S12). If the controller 71 determines that the light receiving signal has not been output (Step S12; NO), the controller 71 returns to Step S5 to repeat Step S5 and the following steps.

There may be two or more printing target points (i.e., blotches, which are points desired to be covered by printing) on the skin surface S. In this embodiment, it is assumed that when the printing operation on one point finishes, as shown in FIG. 5, the print head 41 is once positioned at the second position (i.e., evacuated to the position where the print head 41 is not in the angle of view of the imaging device 51), and the imager 5 images the skin surface S again to find another printing target point where printing is to be performed next. Hence, each time the printing operation on one point finishes, Step S5 and the following steps are repeated.

If the controller 71 determines that the light receiving signal has been output (Step S12; YES, shown in FIG. 6), the controller 71 causes the X-direction movement motor 46 of the head movement mechanism 45 to operate to move the print head 41 from the second position to the first position (Step S13).

In the case, which is described above, the threshold values for the intensity level of the electromagnetic waves received (sensed) by the light receiver 12, the receiving (sensing) duration of the electromagnetic waves received (sensed) by the light receiver 12, and/or the like are predetermined, the controller 71 determines that the body 100 is about to be placed on the stand 200 and causes the print head 41 to move from the second position to the first position, when the light receiving signal is output from the light receiver 12 and the light receiving signal satisfies the predetermined threshold value(s) (i.e., the intensity of the received electromagnetic waves is equal to or greater than a predetermined value, the light receiving state continues for a predetermined length of time or longer, a combined condition of these is satisfied, etc.).

If it is before the print head 41 completes the movement from the second position to the first position, and the level of the electromagnetic waves received and sensed by the light receiver 12 decreases (e.g., the intensity level of the electromagnetic waves decreases or the duration of the light receiving state is broken), the controller 71 may cause the print head 41 to stop the movement and move back to the second position in order to maintain the imaging performable state in which imaging of the skin surface S or the like can be performed, for example.

For example, there may be a case where the user nearly places the body 100 on the stand 200, but changes his/her mind, wanting to continue printing. In such a case, when the print head 41 is moved to and reaches the first position, the opening 21 is closed by the print head 41, and accordingly the imaging device 51 cannot perform imaging. Then, the user needs to restart the printing apparatus 1, for example, by keeping the power switch button depressed. This is inconvenient for the user. Further, there may be a case where the user inadvertently brings the body 100 close to the stand 200 after imaging by the imager 5, image analysis and so forth finish. In such a case, the printing process is terminated at the time. Then, it becomes necessary to perform the printing process again, starting from imaging. This is troublesome. In addition, in this case, the processes (steps) up to that point of time may be reset, and the imaging result (captured image), the analysis result and so forth could be lost, for example.

When the print head 41 completes the movement to the first position and closes the opening 21, the light receiver cannot receive the electromagnetic waves from the irradiator 75. Consequently, even if the body 100 thereafter moves away from the stand 200, the separation cannot be sensed.

While the light receiver 12 can receive the electromagnetic waves, the controller 71 may maintain the imaging performable state of the skin surface S or the like according to change in the light receiving state.

In this embodiment, the body 100 of the printing apparatus 1 includes the attitude sensor 13. Hence, the controller 71 may make determination by taking both the light receiving state of the light receiver 12 and the sensing result by the attitude sensor 13 into account. When the controller 71 determines that this is a case where continuation of imaging of the skin surface S or the like is desired, the controller 71 may cause the print head 41 to move to the second position again to return to the imaging performable state or the like even after the body 100 gets close to the stand 200 and the print head 41 reaches the first position.

Further, if the light receiver 12 is arranged at a position where the light receiver 12 can receive the electromagnetic waves from the irradiator 75 with the print head 41 at the first position, thereby closing the opening 21, such as the position that is outside the body 100 and near the opening 21, the controller 71 may return to the imaging performable state or the like according to change in the light receiving state of the light receiver 12 even after the print head 41 completes the movement to the first position.

Then, in this embodiment, when the user operates the power switch button, the printing apparatus 1 is powered down (Power Source OFF) in response to the input operation (Step S14), which ends the process. Instead of the user operation, the printing apparatus 1 may be automatically powered down when the body 100 is placed on the stand 200, when the print head 41 completes the movement from the second position to the first position, or when no operation is made for a predetermined length of time. This can appropriately turn off the power source of the printing apparatus 1 even if the user forgets to turn off the power source of the printing apparatus 1.

The printing apparatus 1 thus configured can prevent the body 100 with the print head 41 at the second position from being placed on the stand 200, and hence ensure that the discharger 411 is covered by the protector 201. Thus, the printing apparatus 1 can perform proper capping.

As described above, the printing apparatus 1 of this embodiment includes: the body 100 having the opening 21 in a surface that faces the printing target during printing; the print head 41 that includes the discharger 411 and performs the printing on the printing target; the head movement mechanism 45 that moves the print head 41 to the first position and the second position different from the first position; the stand 200 that is detachable from the body 100 and include, at the position corresponding to the opening 21, the protector 201 that protects the discharger 411 of the print head 41; and the light receiver 12 as the sensor that senses that the body 100 and the stand 200 are close to one another or far from one another (i.e., senses that the distance between the body 100 and the stand 200 is equal to or shorter than a predetermined distance, or is longer than the predetermined distance), wherein the head movement mechanism 45 moves the print head 41 to the first position in response to the light receiver 12 sensing that the body 100 and the stand 200 are close to one another (i.e., sensing that the distance between the body 100 and the stand 200 is equal to or shorter than the predetermined distance).

Hence, even if the user attempts to place the body 100 on the stand 200 with the print head 41 at the position not corresponding to the opening 21 (i.e., second position), the print head 41 is automatically moved to the capping position corresponding to the protector 201 (i.e., first position) by just sensing the proximity of the body 100 to the stand 200.

Thus, although the printing apparatus 1 is configured such that the print head 41 moves in the body 100, the printing apparatus 1 can avoid poor capping without the user being aware where the print head 41 is positioned.

Further, in this embodiment, the first position is the position where the discharger 411 faces the opening 21, and the second position is the position where the discharger 411 does not face the opening 21.

Hence, when the proximity of the body 100 to the stand 200 is sensed, the print head 41 is automatically moved to the capping position (i.e., first position) where the print head 41 faces the protector 201. Thus, the printing apparatus 1 can avoid poor capping without the user being aware where the print head 41 is positioned.

Further, in this embodiment, the head movement mechanism 45 moves the print head 41 to the first position in response to the light receiver 12 as the sensor sensing that the opening 21 and the protector 201 face and are close to one another.

Thus, the printing apparatus 1 can perform proper capping by covering the discharger 411 exposed through the opening 21 with the protector 201.

Further, the printing apparatus 1 of this embodiment includes the imager 5 that is provided in the body 100 and images the outside of the body 100 through the opening 21, wherein the imager 5 is capable of imaging the outside of the body 100 in the state in which the print head 41 is at the second position.

Thus, imaging is performed with the print head 41 positioned at the second position (evacuated to the position where the print head 41 is not in the angle of view of the imaging device 51). Hence, the imaging operation of the imaging device 51 and the printing operation of the printer 4 can be performed through the same opening 21.

This enables the imaging operation and the printing operation to be performed from substantially the same position in the X direction, and can prevent the misalignment between the optical axis of the imaging device 51 and the nozzle axis of the discharger 411 of the print head 41. This can achieve high-definition printing.

Thus, although the printing apparatus 1 of this embodiment is configured such that the print head 41 moves from the position where printing and capping are performed (i.e., first position), the printing apparatus 1 can position the print head 41 at the first position at the time of capping, and accordingly perform capping for sure and prevent the discharger 411 from drying or the like.

Further, the printing apparatus 1 of this embodiment includes the controller 71 that functions as the information obtaining unit that obtains an analysis result of an image obtained by the imager 5, wherein the print head 41 performs printing based on the analysis result obtained by the information obtaining unit.

Thus, the printing apparatus 1 can perform printing based on an image obtained with no misalignment between the nozzle axis of the discharger 411 of the print head 41 and the optical axis of the imaging device 51, and accordingly achieve high-definition printing.

Further, the printing apparatus 1 of this embodiment includes the irradiator 75 that is included in the body 100 or the stand 200 (stand 200 in this embodiment) and sends out an electromagnetic wave(s), wherein the sensor is the light receiver 12 that is included in the body 100 or the stand 200 (body 100 in this embodiment) and senses the electromagnetic waves.

Thus, a set of an irradiator (light emitter) and a light receiver, which is relatively a simple configuration, can sense the proximity/remoteness state of the body 100 and the stand 200.

Further, in this embodiment, the head movement mechanism 45 moves the print head 41 to the first position where the discharger 411 faces the opening 21 in response to the duration of the electromagnetic waves sensed by the light receiver 12 as the sensor being equal to or longer than a preset length of time, and positions the print head 41 at the second position, which is different from the first position, in response to the duration of the electromagnetic waves sensed by the light receiver 12 being shorter than the preset length of time.

In the case where the controller 71 is configured to determine that the body 100 and the stand 20 are close to one another when the light receiver 12 senses even a small amount of electromagnetic waves, the controller 71 may wrongly determine that the body 100 and the stand 20 are close to one another, namely, in proximity, when the body 100 grazes near the stand 200 and accordingly the light receiver 12 senses the electromagnetic waves, but the body 100 is actually still in the middle of printing.

When the light receiver 12 is sensing the electromagnetic waves for a preset length of time or longer, it is highly likely that the body 100 is moving toward the stand 200. Hence, when sensing the electromagnetic waves for a preset length of time or longer, the printing apparatus 1 moves the print head 41 to the first position, which is the capping position, and accordingly can perform capping at appropriate timing.

Second Embodiment

Next, with reference to FIG. 8 and FIG. 9, a second embodiment of a printing apparatus, a stand and a movement control method according to the present disclosure will be described. This embodiment differs from the first embodiment only in configuration of the sensor. Hence, hereinafter, different points from the first embodiment will be described in particular.

Figure 8:
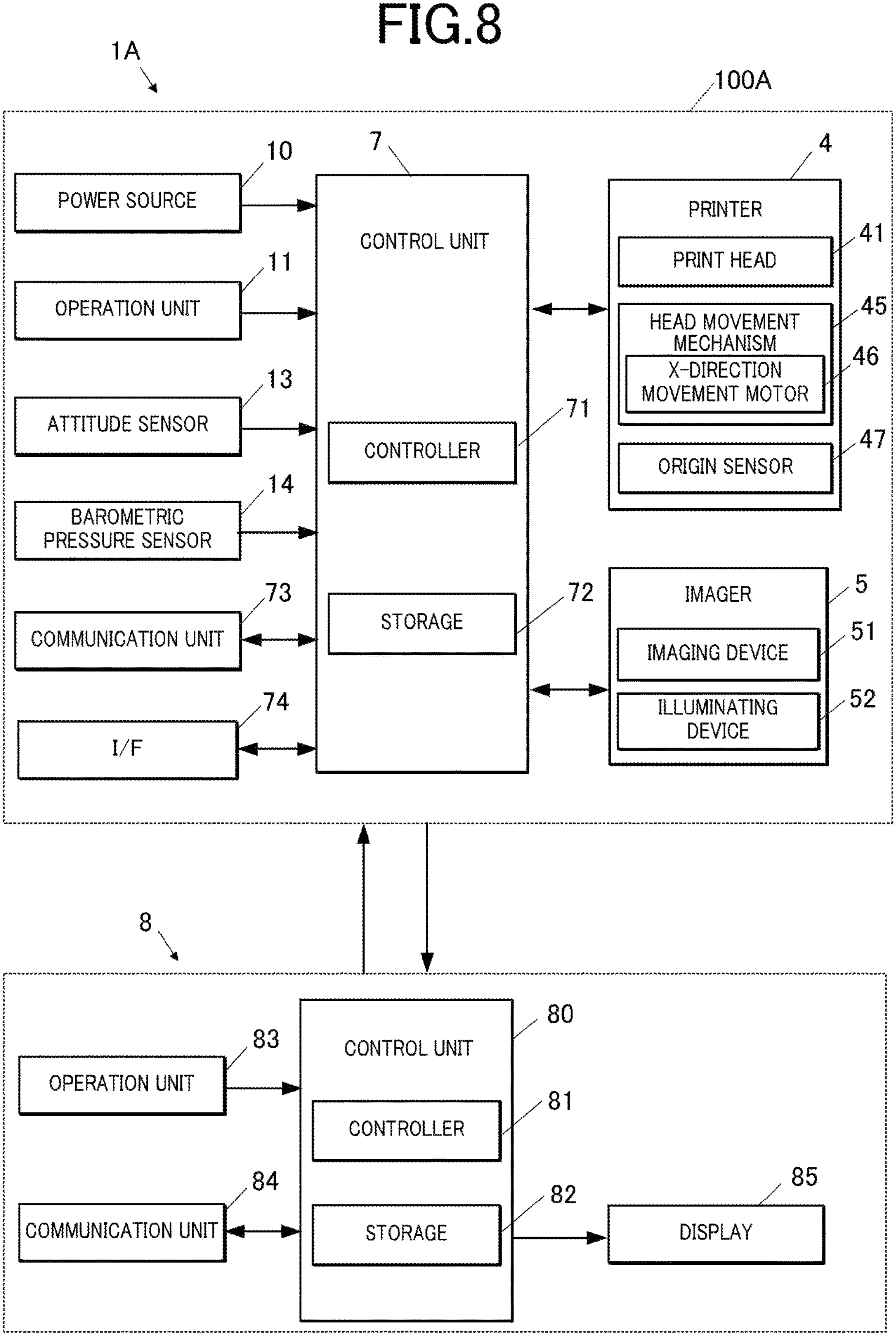
FIG. 8 is a block diagram of the main parts of a printing apparatus according to a second embodiment and its cooperating terminal apparatus, showing control configurations thereof.
Figure 9:
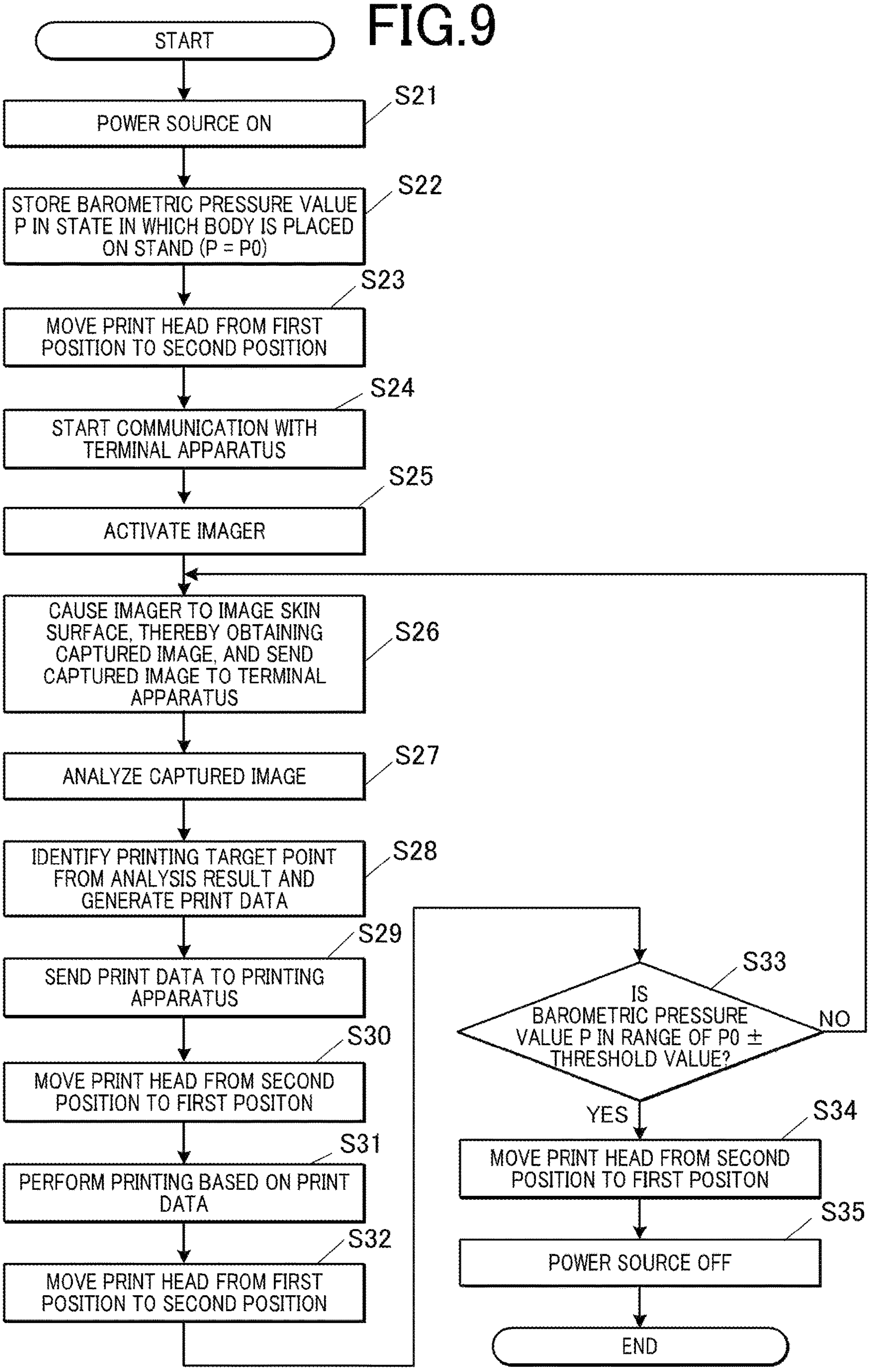
FIG. 9 is a flowchart of a capping control process in the second embodiment.

FIG. 8 is a block diagram of the main parts of a printing apparatus 1A according to the second embodiment and its cooperating terminal apparatus 8, showing control configurations thereof.

As shown in FIG. 8, a body 100A of the printing apparatus 1A of this embodiment includes a barometric pressure sensor 14 as the sensor.

The barometric pressure sensor 14 is a sensor that senses a barometric pressure (atmospheric pressure) value P, and preferably be capable of sensing difference in barometric pressure that is caused by a relatively small change in height too. Hence, for example, a sensor of capacitive sensing using MEMS (Micro Electro Mechanical Systems) technology is suitably used as the barometric pressure sensor 14.

The configuration of the barometric pressure sensor 14 is not limited to the above, but may be a piezo-resistive sensor using a silicon (Si) semiconductor, for example. The position where the barometric sensor 14 is arranged is not particularly limited either.

In the case where the barometric pressure sensor 14 is provided as the sensor, it is unnecessary to provide the stand 200 with an irradiator, a power source that supplies power for irradiation, or the like. Hence, as compared with the first embodiment, the configuration of the stand 200 can be simpler.

In the case where the barometric pressure sensor 14 is used as the sensor, the barometric pressure in the state in which the body 100A is placed on the stand 200 is used as a reference. Hence, the storage 72 of the body 100A stores, in advance, the barometric pressure value P in the state in which the body 100A is placed on the stand 200 (value P in this state is referred to as "P0").

The "P0" varies depending on the place where the stand 200 is placed in the environment where the printing apparatus 1A is used. Hence, at the point of time when the user decides the place for the stand 200, he/she places the body 100A on the stand 200, and the barometric pressure value P0 in this state is obtained by the barometric pressure sensor 14 and stored. If the height position where the stand 200 is placed is changed from the initial height position (e.g., if the place for the stand 200 is changed from a floor to a shelf), at the new place, the user places the body 100A on the stand 200, and the barometric pressure value P0 is obtained by the barometric pressure sensor 14 and stored in the storage 72 or the like.

The other components or the like are the same as those of the first embodiment, and hence their descriptions will be omitted by giving the same reference signs to the same components.

Next, with reference to FIG. 9, a capping control method/process (movement control method) for the printing apparatus of this embodiment will be described.

First, the printing apparatus 1 is powered up (Power Source ON) (Step S21) as in the first embodiment, and obtains, with the barometric pressure sensor 14, the barometric pressure value P in the state in which the body 100A is placed on the stand 200, namely, the value P0, as a reference, and stores the obtained value P0 in the storage 72 or the like (Step S22).

If the barometric pressure value P0 has already been obtained and stored, and the position (place) of the stand 200 has not been changed since the obtainment time of this value P0, it is unnecessary to obtain the barometric pressure value P0 again, and the already stored value P0 is used.

Step S23 to Step S32 are the same as Step S2 to Step S11 of the first embodiment shown in FIG. 7, respectively, and hence their descriptions will be omitted.

The barometric pressure value P sensed by the barometric pressure sensor 14 is always output to the controller 71, and the controller 71 always determines whether the barometric pressure value P is in the range of the reference barometric pressure value P0±a threshold value (Step S33). The threshold value in this case is appropriately set in accordance with the precision of the barometric pressure sensor 14, the operating environment of the printing apparatus 1A, and/or the like.

If the barometric pressure value P is not in the range of the reference barometric pressure value P0±the threshold value (Step S33; NO), it means that the body 100A is far (separate) from the stand 20, and the controller 71 determines that the user is holding the body 100A in his/her hand and the body 100A is performing the imaging operation or the like, and returns to Step S26 to repeat Step S26 and the following steps.

If the barometric pressure value P sensed by the barometric pressure sensor 14 is in the range of the reference barometric pressure value P0±the threshold value (Step S33; YES), the controller 71 causes the X-direction movement motor 46 of the head movement mechanism 45 to operate to move the print head 41 from the second position to the first position (Step S34). Then, the printing apparatus 1 is powered down (Power Source OFF) (Step S35), which ends the process.

Like this embodiment, in the case where the proximity/remoteness state of the body 100A and the stand 200 is sensed on the basis of the barometric pressure value P sensed by the barometric pressure sensor 14, when the user once starts to place the body 100A on the stand 200, but changes his/her mind and lifts it up again, wanting to continue imaging or printing, this user's motion (movement of the body 100A) is reflected in the barometric pressure value P, which the barometric pressure sensor 14 senses. This enables processing fit for the user's intention.

That is, for example, when the user wants to finish printing and places the body 100A on the stand 200, the protector 201 of the stand 200 covers the discharger 411 of the print head 41, thereby performing capping. As another example, when the user once starts to place the body 100A on the stand 200, but lifts it up again, the print head 41 is moved back to the second position to maintain the imaging performable state or the like.

As in the first embodiment, the body 100A of this embodiment includes the attitude sensor 13. Referring to the sensing result by the attitude sensor 13 together with change in the barometric pressure value P, which the barometric pressure sensor 14 senses, enables processing that closely matches the actual user's motion.

As mentioned above, the sensing result by the attitude sensor 13 may be referred to together with the sensing result by the barometric pressure sensor 14.

If movement of the body 100A has little change in altitude, and accordingly the change is not reflected in the barometric pressure value P, namely, for example, if the user horizontally moves the body 100A from the position of the stand 200, it is difficult, with the barometric pressure sensor 14, to determine the proximity/remoteness state of the body 100A and the stand 200. Even in such a case, by referring to the sensing result by the attitude sensor 13, the printing apparatus 1 can grasp the proximity/remoteness state of the body 100A and the stand 200 precisely, and perform more proper capping control.

More specifically, for example, a configuration may be employed to determine the attitude of the body 100A with the attitude sensor 13, and when the body 100A is horizontal or almost horizontal and the barometric pressure value P is in the range of P0±the threshold value, move the print head from the second position to the first position, for example. Thus, the attitude sensor 13 makes it possible to grasp the proximity of the body 100A to the stand 200 more precisely, and also makes it possible to grasp the remoteness of the body 100A from the stand 200 more precisely.

The other points of the second embodiment are the same as those of the first embodiment, and hence their descriptions will be omitted.

As described above, this embodiment has the same effects as the first embodiment and also has the following effects.

The sensor of this embodiment is the barometric pressure sensor 14 included in the body 100A.

The barometric pressure sensor 14 included in the body 100A makes it easy to sense the proximity/remoteness state of the body 100A and the stand 200.

Even if the user attempts to place the body 100A on the stand 200 with the print head 41 at the second position not corresponding to the opening 21, the print head 41 is automatically moved to the capping position (i.e., first position) corresponding to the protector 201 by just sensing the proximity of the body 100A to the stand 200.

Thus, although the printing apparatus 1A is configured such that the print head 41 moves in the body 100A, the printing apparatus 1A can avoid poor capping without the user being aware where the print head 41 is positioned.

In the above, some embodiments of the present disclosure have been described. It goes without saying, however, that the present disclosure is not limited to these embodiments, but can be modified in various respects in a range of not departing from the scope of the present disclosure.

For example, in the above embodiments, the sensor that senses the proximity/remoteness state of the body and the stand 200 having the protector is the light receiver 12 (first embodiment) or the barometric pressure sensor 14 (second embodiment), but not limited thereto.

For example, the imaging device 51 of the imager 5, which is provided for imaging the skin surface S, may be configured to also function as the sensor that senses the proximity/remoteness state of the body and the protector.

More specifically, to the stand 200, an identification mark, such as a bar code or a QR Code®, is attached and set in such a way as to be brought into focus when the imaging device 51 gets to a predetermined distance with respect to the identification mark and images it. The imaging device 51 images the identification mark attached to the stand 200, thereby sensing whether the body and the stand are close to one another. As another example, the stand 200 itself or part thereof is shaped to be easily identified, and the controller 71 determines that the body and the stand are close to one another when the imaging device 51 recognizes the shape.

In these cases, the proximity/remoteness state of the body and the stand can be sensed by a simpler configuration, without providing the printing apparatus with a sensor therefor. That is, the imaging device 51 functions as the sensor too. Thus, the printing apparatus can automatically position the print head 41 at the position suitable for capping, no matter where the print head 41 stops moving.

Further, in the first embodiment, one of the body 100 and the stand 200 includes the irradiator, and the other one includes the light receiver (to be specific, in the first embodiment, the stand 200 includes the irradiator, and the body 100 includes the light receiver as the sensor), but either the body 100 or the stand 200 may include both the irradiator and the light receiver as the sensor.

In this case, for example, the light (electromagnetic waves) emitted from the irradiator included in one of the body 100 and the stand 200 is reflected on the other one of these, and the reflected light (electromagnetic waves) is sensed by the light receiver as the sensor included in the one of these. When the intensity of the sensed light (electromagnetic waves) is equal to or greater than a predetermined threshold value, the controller 71 determines that the body 100 and the stand 200 are close to one another, and causes the print head 41 to move to the first position, for example.

In order to maintain the intensity of the reflected light, the part where the light (electromagnetic waves) emitted from the irradiator is reflected may be configured to be a mirror plane, or may be provided with a reflective plate or the like to ensure the reflection of the light (electromagnetic waves).

Further, in the first embodiment, in the state in which the print head 41 is positioned at the first position, the opening 21 is closed by the print head 41 almost entirely. However, the size, arrangement or the like of the print head 41 is not limited to the above.

Figure 10:
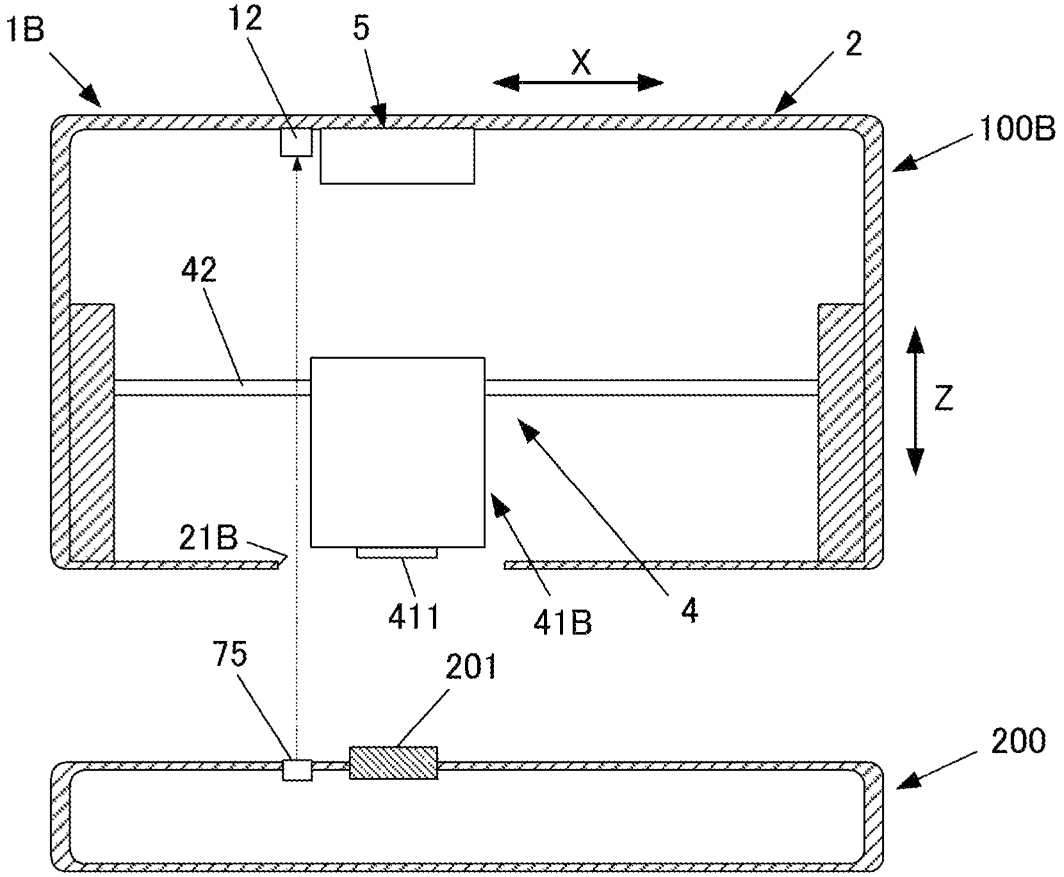
FIG. 10 is a schematic sectional view of the main part of a body according to a modification, showing a state in which the body being close to the stand is sensed.

For example, as shown in FIG. 10, the width of a print head 41B in the X direction, the print head 41B being arranged in a body 100B of a printing apparatus 100B is narrowed from that of the print head 41. Hence, even in the state in which the print head 41B is positioned at the first position, an opening 21B is not closed by the print head 41B entirely, and accordingly the light (electromagnetic waves) emitted from the irradiator 75 can be sensed by the light receiver 12.

Alternatively (or additionally), the width of the print head 41 in the direction perpendicular to the X direction and the Z direction may be narrowed. Hence, the opening 21 is not closed in part, the part being on the near side and/or the far side in FIG. 1, etc., and the irradiator 75 and the light receiver 12 may be arranged in such a way as to face (correspond to) the part of the opening 21 not closed by the print head 41.

Still alternatively (or additionally), the size of the opening 21 may be made larger with the size of the print head 41 unchanged. Hence, even in the state in which the print head 41 is positioned at the first position, the opening 21 is not closed by the print head 41 entirely, and the irradiator 75 and the light receiver 12 may be arranged in such a way as to face (correspond to) the part of the opening 21 not closed by the print head 41.

With any of the above configurations, for example, as shown in FIG. 10, even after the print head 41B completes the movement to the first position in response to the light receiver 12 sensing the light (electromagnetic waves) emitted from the irradiator 75 and thereby sensing the proximity of the body 100B to the stand 200, when the light receiver 12 does not sense the light (electromagnetic waves), the controller 71 can determine that the body 100B is far (separate) from the stand 200 again, and perform control to move the print head 41B back to the second position to return to the imaging performable state or the like.

Further, in the above embodiments, a not-shown guide(s) may be arranged on the upper surface or the like of the stand 200, and a hole(s) or the like corresponding to the guide(s) may be formed in the lower surface or the like of the body 100. Examples of the guide include a shaft and a projection that almost vertically stand along the Z axis (direction).

This makes it possible to determine the position of the body 100 to be placed on the stand 200, and place the body 100 on the stand 200 almost vertically with no tilt.

It is preferable that the guide be a component that extends upward from the upper surface or the like of the stand 200 by a few to several centimeters. The guide and the hole are not particularly limited in shape, arrangement or the like.

Alternatively, a recess(es) or the like that receives the body 100 may be formed in the upper surface of the stand 200 to determine the position of the body 100 to be placed and stably place the body 100.

The stand 200 is not limited to a platform-shaped stand, but may be a box-shaped stand surrounded by side walls to perform precise capping by the body 100 being put in the box-shaped stand.

This too makes it possible to determine the position of the body 100 to be placed on the stand 200, and place the body 100 on the stand 200 almost vertically with no tilt.

Further, in the above embodiments, the printing apparatus 1 is configured to perform printing in cooperation with the terminal apparatus 8, but not limited thereto and may be configured to complete printing by itself.

For example, in the above embodiments, images captured by the imaging device 51 of the printing apparatus 1 are sent to the terminal apparatus 8, and the controller 81 of the terminal apparatus 8 analyzes the captured images and generates print data based on the analysis results, for example. However, the controller 71 of the printing apparatus 1 may perform these.

Further, in the above embodiments, the display 85 of the terminal apparatus 8 displays the images captured by the imaging device 51. However, the printing apparatus 1 may include a display. In this case, the display of the printing apparatus 1 may display the images captured by the imaging device 51.

Although some embodiments or the like of the present disclosure have been described above, the scope of the present disclosure is not limited to the embodiments or the like described above, but includes the scope of the disclosure described in the claims and the scope of their equivalents.

What is claimed is:

1. A printing apparatus comprising:
   a body having an opening that faces a printing target during printing;
   a print head that is provided in the body and performs the printing on the printing target;
   a mover that is provided in the body and moves the print head to a first position corresponding to the opening and a second position different from the first position;
   a stand detachable from the body; and
   a sensor that at least senses that a distance between the body and the stand is equal to or shorter than a predetermined distance,
   wherein the mover moves the print head from the second position to the first position in response to the sensor sensing that the distance between the body and the stand is equal to or shorter than the predetermined distance.

2. The printing apparatus according to claim 1,
   wherein the print head includes a discharger that is, in a state in which the print head is at the first position, capable of being exposed through the opening to outside of the body and discharging a liquid, and
   wherein the stand includes a protector that is provided at a position corresponding to the first position, which corresponds to the opening, in a state in which the body is placed on the stand, and protects the discharger of the print head.

3. The printing apparatus according to claim 2, wherein the mover moves the print head to the first position in response to the sensor sensing that the opening and the protector face one another and the distance between the opening and the protector is equal to or shorter than the predetermined distance.

4. The printing apparatus according to claim 1, further comprising an irradiator that is included in the body or the stand and sends out an electromagnetic wave, and
   wherein the sensor is a light receiver that is included in the body or the stand and senses the electromagnetic wave.

5. The printing apparatus according to claim 4, wherein the mover
   moves the print head from the second position to the first position in response to a duration of the electromagnetic wave sensed by the light receiver being equal to or longer than a preset length of time, and
   positions the print head at the second position in response to the duration of the electromagnetic wave sensed by the light receiver being shorter than the preset length of time.

6. The printing apparatus according to claim 1, wherein the sensor is a barometric pressure sensor included in the body.

7. The printing apparatus according to claim 6, wherein the mover
   moves the print head from the second position to the first position in response to the barometric pressure sensor sensing a barometric pressure value in a predetermined range, and
   positions the print head at the second position in response to the barometric pressure sensor not sensing the barometric pressure value in the predetermined range.

8. The printing apparatus according to claim 1, further comprising an imager that is provided in the body and images outside of the body through the opening,
   wherein the imager is capable of imaging the outside of the body through the opening in a state in which the print head is at the second position.

9. A stand comprising an irradiator that sends out an electromagnetic wave,
   wherein the stand is capable of holding a body of a printing apparatus,
   wherein the body has an opening that faces a printing target during printing, and
   wherein the printing apparatus includes:
      the body;
      a print head that is provided in the body and performs the printing on the printing target;
      a light receiver that senses the electromagnetic wave; and
      a mover that is provided in the body and moves the print head to a first position corresponding to the opening in response to the light receiver sensing the electromagnetic wave.

10. A movement control method comprising:

during no-printing by a printing apparatus including a body having an opening that faces a printing target during printing, a print head that is provided in the body and performs the printing on the printing target, and a stand detachable from the body, positioning the print head at a second position different from a first position corresponding to the opening; and moving the print head from the second position to the first position in response to sensing that a distance between the body and the stand is equal to or shorter than a predetermined distance.

11. The movement control method according to claim 10, wherein the print head includes a discharger that is, in a state in which the print head is at the first position, capable of being exposed through the opening to outside of the body and discharging a liquid, and wherein the stand includes a protector that is provided at a position corresponding to the first position, which corresponds to the opening, in a state in which the body is placed on the stand, and protects the discharger of the print head.

12. The movement control method according to claim 11, wherein the moving includes moving the print head to the first position in response to sensing that the opening and the protector face one another and the distance between the opening and the protector is equal to or shorter than the predetermined distance.

13. The movement control method according to claim 10, wherein an irradiator that sends out an electromagnetic wave is included in the body or the stand and, wherein a light receiver that senses the electromagnetic wave is included in the body or the stand.

14. The movement control method according to claim 13, wherein the moving includes moving the print head from the second position to the first position in response to a duration of the electromagnetic wave sensed by the light receiver being equal to or longer than a preset length of time, and wherein the positioning includes positioning the print head at the second position in response to the duration of the electromagnetic wave sensed by the light receiver being shorter than the preset length of time.

15. The movement control method according to claim 10, wherein a barometric pressure sensor that senses that the distance between the body and the stand is equal to or shorter than the predetermined distance is included in the body.

16. The movement control method according to claim 15, wherein the moving includes moving the print head from the second position to the first position in response to sensing, with the barometric pressure sensor, a barometric pressure value in a predetermined range, and wherein the positioning includes positioning the print head at the second position in response to not sensing, with the barometric pressure sensor, the barometric pressure value in the predetermined range.

17. The movement control method according to claim 10, wherein an imager that images outside of the body through the opening is provided in the body, and wherein the imager is capable of imaging the outside of the body through the opening in a state in which the print head is at the second position.

* * * * *